May 2, 1967

R. S. VOGEL 3,316,801

MICROSCOPE IN COMBINATION WITH A MICROSPARK PROBE INCLUDING AN UNSHIELDED ELECTRODE OF SMALL TIP RADIUS

Filed Jan. 17, 1964

Raymond S. Vogel,
Inventor.
Koenig, Senniger, Powers and Leavitt,
Attorneys.

May 2, 1967 R. S. VOGEL 3,316,801
MICROSCOPE IN COMBINATION WITH A MICROSPARK PROBE INCLUDING
AN UNSHIELDED ELECTRODE OF SMALL TIP RADIUS
Filed Jan. 17, 1964 5 Sheets-Sheet 3

May 2, 1967
R. S. VOGEL
3,316,801
MICROSCOPE IN COMBINATION WITH A MICROSPARK PROBE INCLUDING
AN UNSHIELDED ELECTRODE OF SMALL TIP RADIUS
Filed Jan. 17, 1964
5 Sheets-Sheet 5
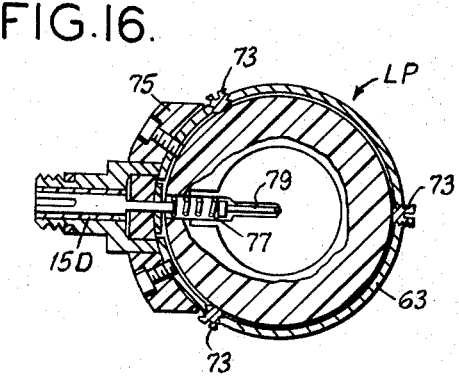
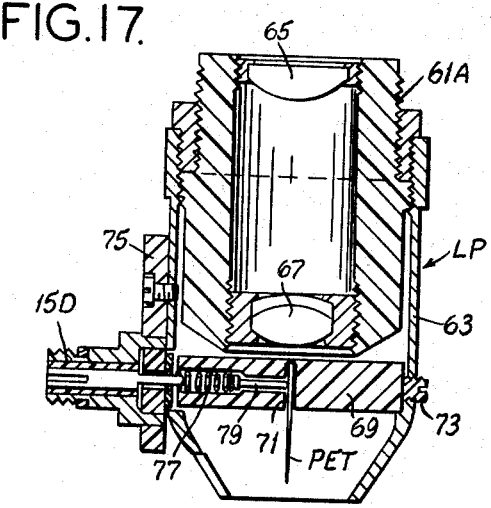
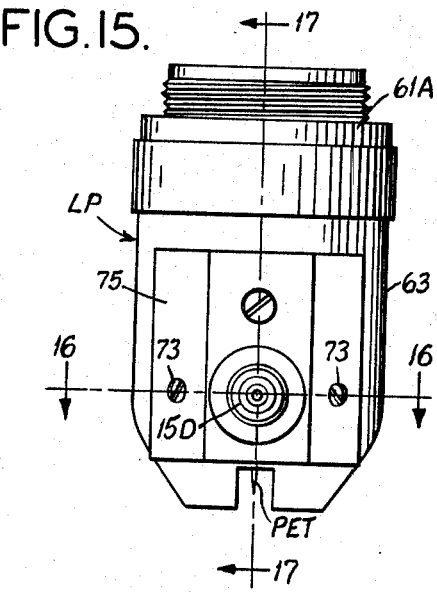

United States Patent Office 3,316,801
Patented May 2, 1967

3,316,801
MICROSCOPE IN COMBINATION WITH A MICRO-SPARK PROBE INCLUDING AN UNSHIELDED ELECTRODE OF SMALL TIP RADIUS
Raymond S. Vogel, Kirkwood, Mo., assignor, by mesne assignments, to the United States of America as represented by the United States Atomic Energy Commission
Filed Jan. 17, 1964, Ser. No. 338,456
16 Claims. (Cl. 88—14)

Several systems have been developed and are currently employed to obtain information on the micro-composition of materials, such as metallographically prepared samples. The most recently developed include the use of an electron beam or probe type microanalyzer and optical masers for direct excitation of minute areas on a sample surface. Each of these systems is quite expensive and has additional disadvantages. For example, the electron beam apparatus now in use is not only very costly but has a sensitivity which is decreased or limited by the atomic numbers of the elements of the material analyzed, i.e., elements having an atomic number below about 13 cannot be sensed and detected as reliably as the heavier elements. With the commercially available maser equipment, the smallest sample area that can be analyzed in situ is in the order of 50–100 microns in diameter. The ability selectively to excite and analyze a minute sample area in situ is referred to as analytical resolving power. Prior apparatus for direct electrical sparking of the mico-areas to be examined also has the disadvantage of low analytical resolving power, and attempts to increase the resolution by the use of smaller electrodes and confining or shielding the electrode and gap have been unsatisfactory because of corona discharge and erratic discharge frequency effects, and rapid erosion of confining envelopes or shields.

Among the several objects of this invention are the provision of apparatus having a high resolving power, e.g., in the order of 5–20 microns, and substantially uniform sensitivity for in situ microanalysis of selected micro-areas of a sample; the provision of apparatus and methods of the class described which will excite and provide spectroscopic information on the microcomposition of any preselected micro-area on the surface of conventional metallographically prepared samples by direct electrical excitation; the provision of such systems in which any desired particular micro-area on a sample surface can be optically observed and precisely preselected and thereafter precisely and discretely excited to provide a spark plasma for spectroscopic analysis, qualitatively or quantitatively; the provision of apparatus and methods for in situ microanalysis of preselected sample micro-areas in which an unconfined precisely controlled point-to-plane intermittent spark discharge in air may be utilized to directly excite the micro-area with a stabilized predetermined discharge frequency and a reduced corona discharge; the provision of such apparatus which is capable of producing spectrograms of the preselected sample micro-area of suitable density with conventional equipment ordinarily found in industrial laboratories; and the provision of apparatus which is relatively simple, reliable and inexpensive. Other objects and features will be in part obvious and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a schematic diagram of apparatus of the present invention;

FIG. 15 is an elevation of a microspark probe-objective unit of this invention;

FIG. 16 is a transverse cross section on line 16—16 of FIG. 15; and

FIG. 17 is a longitudinal cross section on line 17—17 of FIG. 15.

Corresponding reference characters indicate corresponding parts throughout the several views of the drawings.

Figure 1:
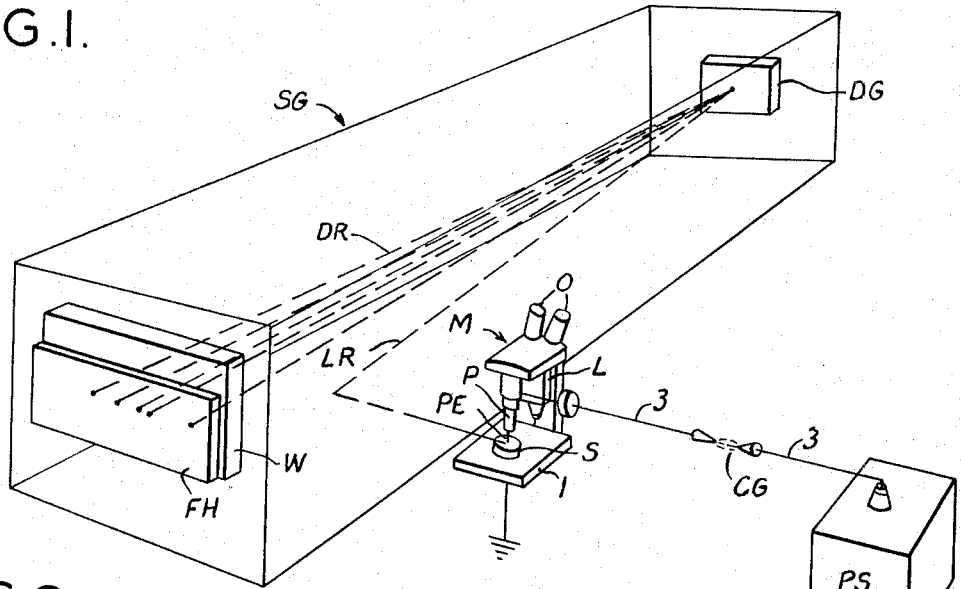

Referring now more particularly to the drawings, apparatus for in situ microanalysis of a selected micro-area of a sample to be spectroscopically analyzed is illustrated in FIG. 1. A metallographically prepared specimen of sample S, such as a section of a metal core to be examined for microinclusions and the analysis thereof, is shown secured to the stage 1 of a microscope M. Although a stereomicroscope with dual oculars O is illustrated, it is to be understood that any conventional microscope with a filar type ocular may be used in the practice of this invention. A microspark probe P is mounted on the microscope in the same fashion as an objective lens and in a position to locate a probe electrode PE with its tip closely spaced relative to a preselected micro-area of the sample to be analyzed. An objective lens L is also mounted on the microscope, lens L and probe P being commonly secured to a reciprocal mounting plate so that either may be alternately moved into precise optical alignment with the ocular. The small spacing between the sample surface and the contiguous tip of probe electrode PE constitutes a first or analytical spark gap AG which, when it has a sufficiently high electrical potential applied thereacross, will form a spark discharge which directly excites the preselected sample micro-area to form a spark-discharge plasma. A relatively high voltage (in the general order of 600 v. to 2000 v.) potential source PS is electrically interconnected in a circuit with the analytical gap by conductors 3 and an intermediate spark gap CG, which constitutes means for controlling the characteristics of the microspark across the analytical gap. The electrical circuit including these two serially connected spark gaps across which the high voltage potential source is applied is completed through a ground return circuit as indicated.

In order spectroscopically to analyze the microspectra of the spark plasma generated at the first gap, a conventional spectrograph SG is employed. Microscope M is attached to the optical bench of SG and preferably so positioned that the spark column or plasma in the first gap is located at the entrance aperture of SG and effectively constitutes the spectrograph entrance slit thereof. The spectral radiation from the spark plasma is transferred as indicated diagrammatically by light rays LR, such as by a 90° total reflecting prim, to impinge upon the surface of a diffraction grating DG. The spark plasma image is thereby spectrally spread or dispersed and the spectral components of different wave lengths are transmitted as indicated by rays DR so as to fall upon a calibrated window W. To provide a spectrogram, a photographically sensitive film is mounted against the spectrograph window by means of a plate or film holder FH. It will be understood that a prism type rather than a diffraction grating type of spectroscopic and spectrographic apparatus is similarly employable.

Figure 2:
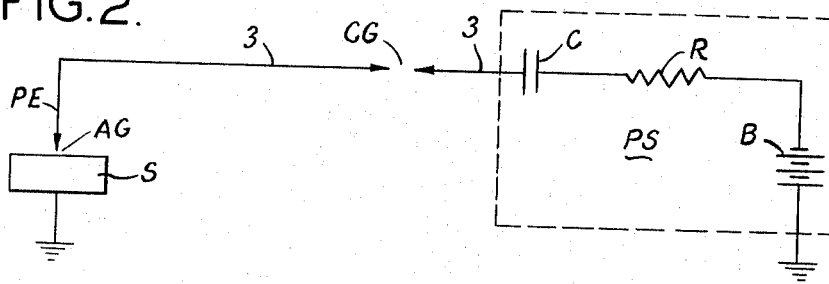
FIG. 2 is a circuit diagram of apparatus of this invention.

One of the serious disadvantages of prior instrumentation of microanalysis of sample micro-areas by microspark techniques was the low analytical resolving power and, as noted above, efforts to increase this resolution were in vain because of various defeating phenomena such as corona discharge and spark discharge frequency instability. In accordance with the present invention, it has been found that by employing a novel control means in the circuit between the analytical gap and the potential source, the characteristics of the microspark can be successfully controlled so that microspectra of discrete sample micro-areas as minute as about 5 microns in width may be produced, analyzed and recorded. This is accomplished by serially interconnecting the second or intermediate spark gap CG in the circuit between the potential source of electrical power PS and analytical gap AG. This novel circuitry is shown in FIG. 2 wherein source PS is schematically shown to constitute a battery, as exemplary of any D.C. voltage source, a series resistor R and a capacitor C.

Figure 3:
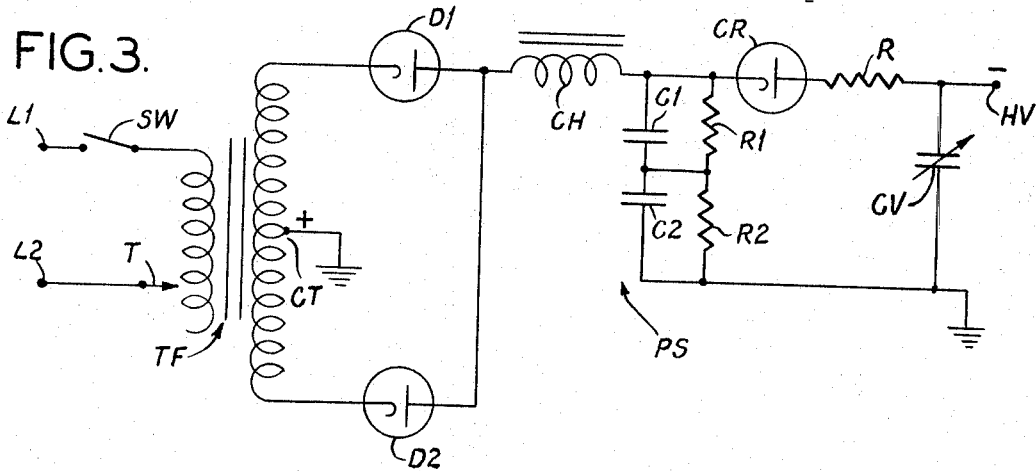
FIG. 3 is a circuit diagram of an auxiliary high voltage potential source unit employed in the practice of this invention.

Although any conventional potential source (capable of providing about 600 v.–2000 v. of preferably unidirectional electric power able to supply about 50 or so microamperes average current) is satisfactory in the practice of this invention, a somewhat simplified circuit diagram of an exemplary source PS is illustrated in FIG. 3. A.C. power supplied by lines L1, L2 is applied via switch SW to an adjustable voltage transformer TF having a movable primary tap T. The secondary winding of TF has a grounded centertap CT and the secondary winding terminals are interconnected to the cathodes of two rectifying diodes D1, D2, the anodes of which are commonly connected to one lead of a smoothing choke CH. The output lead of CH is connected to the cathode of a circuit limiter CR (such as a type 3B24–W), the anode of which is connected to a negative polarity high voltage terminal HV via resistor R. Connected between the cathode of CR and ground are a capacitance, comprising series-connected capacitors C1, C2, and shunting resistances R1 and R2. A variable capacitor CV is optionally connected between terminal HV and ground. Thus, a smoothed filtered full-wave rectified unidirectional potential is provided by source PS between ground (+ polarity) and the negative polarity terminal HV.

Figure 4:
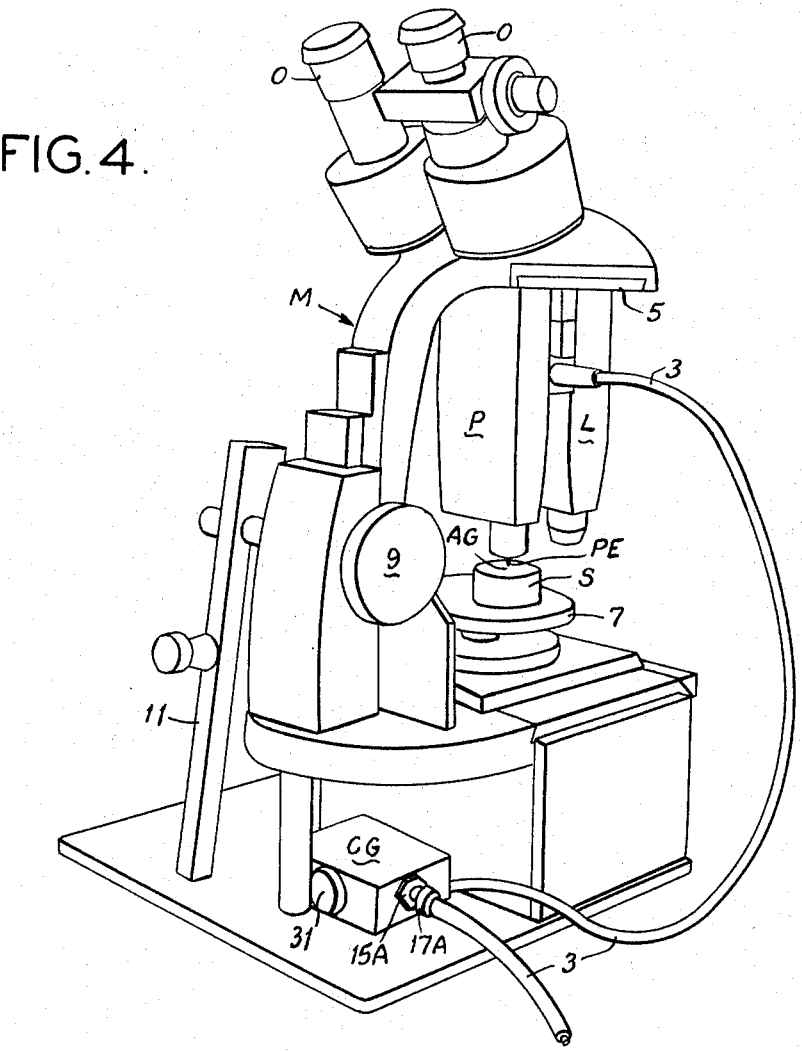
FIG. 4 is a perspective view of an embodiment of the present invention.

Microscope M is illustrated in more detail in FIG. 4, and the reciprocal mounting plate on which both objective L and probe unit P are attached is indicated by reference numeral 5. Simple S is shown positioned on a motor-driven stage 7 which is electrically grounded, and when the motor is actuated the surface of the sample may be moved at any desired rate over a preselected course to provide for scanning of the sample surface. A coarse focusing knob 9 and a fine focus adjustment lever 11 permit accurate optical focusing of the microscope on any preselected sample micro-area. After the optical image of this preselected area is aligned on the optical axis of the microscope by positioning it at the intersection of the cross hairs or other conventional reference system of the filar type ocular O, the spectroscopist merely manually shifts the position of the probe P and lens L in a single movement to the position shown which precisely locates the tip of electrode PE directly over, but spaced slightly away from, the preselected sample micro-area, thus forming the first or analytical spark gap AG.

Figure 11:
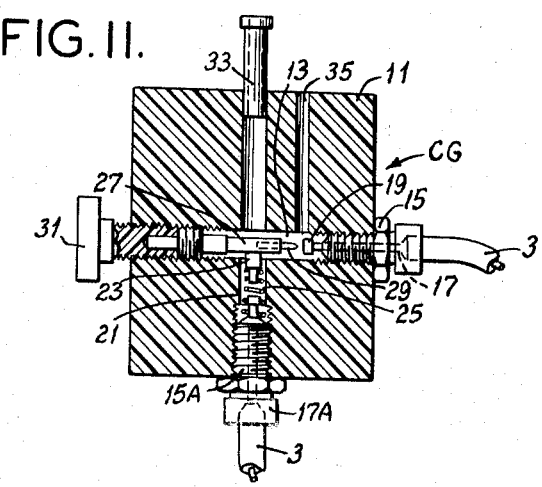
FIG. 11 is a longitudinal cross section on line 11—11 of FIG. 10.
Figure 10:
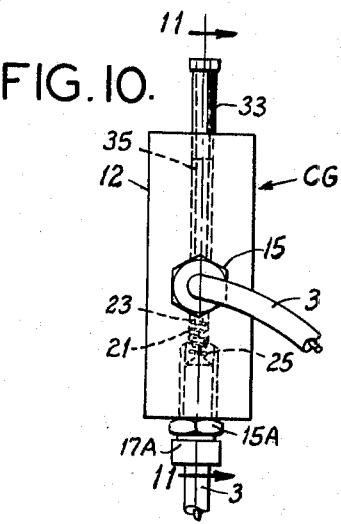
FIG. 10 is a side elevation of an exemplary intermediate gap unit employed in the practice of this invention.
Figure 6:
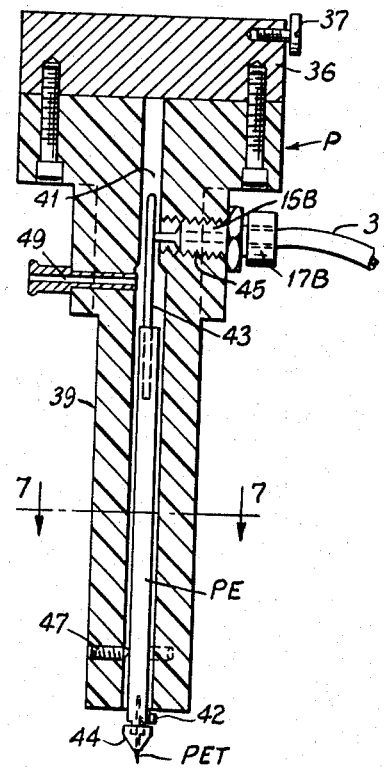
FIG. 6 is a longitudinal cross section on line 6—6 of FIG. 5.
Figure 5:
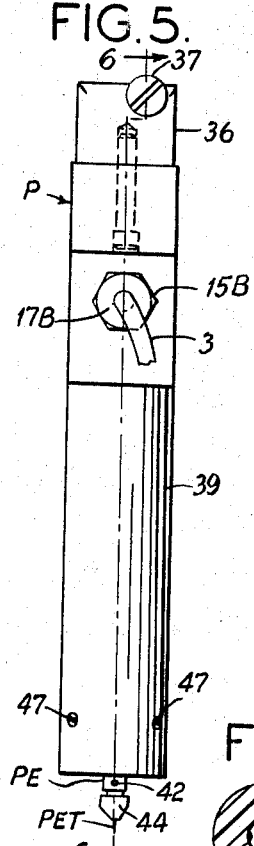
FIG. 5 is a side elevation of an exemplary microspark probe unit of the FIG. 4 apparatus.
Figure 7:
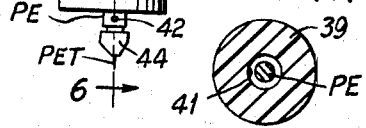
FIG. 7 is a transverse cross section on line 7—7 of FIG. 6.
Figure 8:
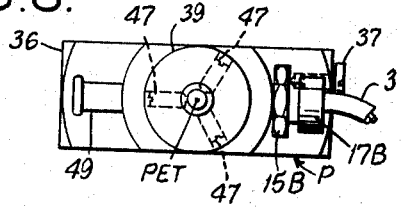
FIG. 8 is a bottom plan view of the microspark probe of FIG. 5.

An exemplary intermediate spark gap CG for controlling the characteristics of the spark column or plasma in gap AG is illustrated in FIGS. 10 and 11. This assembly includes a body 12 of insulating material such as a synthetic resin having a transverse bore 13. Screw-threaded in one end of bore 13 is a metal connector jack or socket 15 which receives a pin-connector end 17 of one insulated cable conductor 3. The inner end of socket 15 carries an electrode 19 which functions as the stationary electrode of the gap CG. A pin-connector end 17A of the other cable conductor 3 is physically and electrically connected by means of a second similar metal connector jack or socket 15A which is screw-threaded in a second passage 21 of body 11. An electrical brush or contact 23 is also mounted in passage 21 and biased by means of a spring 25 (which bears against the inner end of connector 15A) against the surface of a second electrode 27 mounted coaxially in bore 13. The inner end of electrode 27 comprises a replaceable electrode tip 29, while the outer end thereof carries an insulated knob 31 for adjusting the gap length or magnitude of intermediate spark gap CG. An inlet passage and fitting 33 serves as an optional gas inlet for gap CG while a second passage 35 serves as an optional gas outlet in the event it is desired to operate gap CG in an atmosphere other than air.

Microspark probe P is illustrated in detail in FIGS. 5–9. It comprises a metal mounting base section 36 adapted to be received in the reciprocal mounting plate of microscope M and to be locked thereto by screw 37. Depending downwardly and secured to base section 36 is a probe body 39 of insulating material, such as a synthetic resin, having an axial bore 41. Mounted coaxially in bore 41 is probe electrode PE which includes a removable fine probe electrode tip PET clamped at its lower end by a screw 42, and an extension 43 of reduced diameter at its upper end. An insulating tapered plastic bushing 44 is secured to the lower end of PE. A metal connector jack or socket 15B is screw-threaded into a cross passage 45 and has an inner tip which contacts probe electrode extension 43, thereby providing electrical circuit continuity between electrode PE and cable conductor 3, which has a pin-connector end 17B plugged into the outer end of jack 15B. Three centering screws 47 are provided for precisely aligning probe electrode PE along the longitudinal axis of probe P. Optionally a gas inlet 49 is provided if it is desired to operate the analytical gap AG in an atmosphere other than air.

The probe electrode tip PET, which constitutes the cathode electrode of gap AG in the embodiment illustrated, is made of a fine filament having an extremely sharp point, i.e., a point radius in the order of about 1 micron. An exemplary electrode tip is fabricated by electrolytically or chemically eroding the end of a fine tungsten filament. In the electrolytic erosion method, sodium hydroxide with a trace of copper ion was employed as the electrolyte, while a fused sodium nitrite bath was used in the chemical method. By such methods, electrode tips with smooth points of less than 1 micron radius may readily be made.

Figure 12:
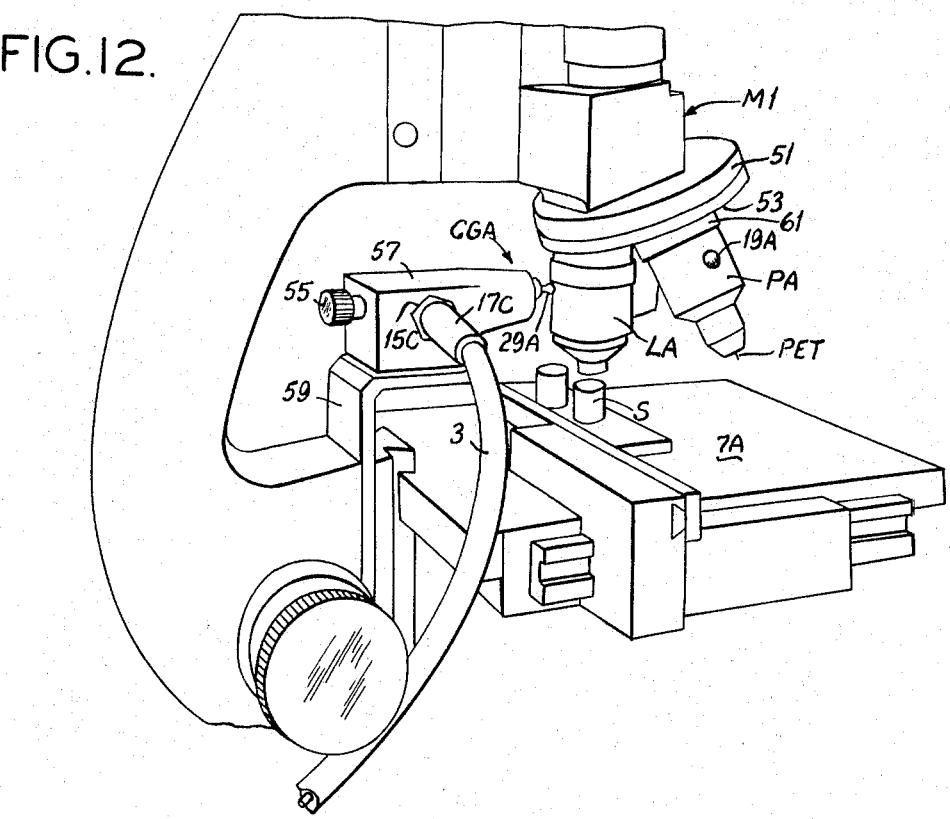
FIG. 12 is a fragmentary perspective of another embodiment of this invention with the objective positioned in optical alignment with the ocular.
Figure 13:
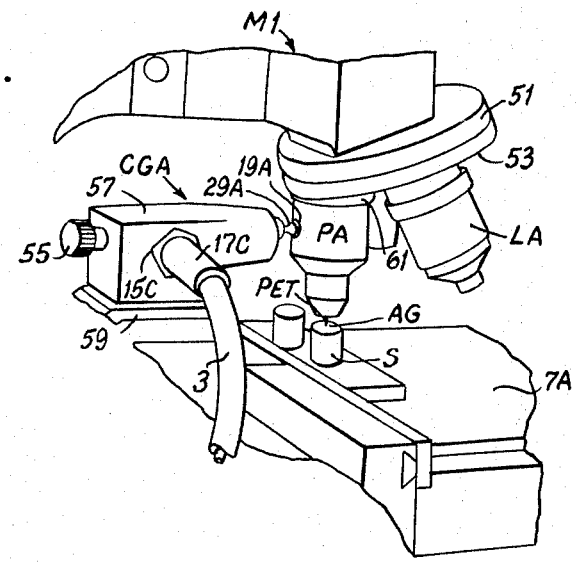
FIG. 13 is a view similar to that of FIG. 12 but with the microspark probe positioned in optical alignment with the ocular.

Described previously was a microscope M in which spark probe PE was readily interchangeable with an objective lens on a stereomicroscope, and the objective L was moved into and out of alignment with the sample micro-area alternately with the microspark probe P by straight-line reciprocal motion. In FIGS. 12 and 13 a conventional microscope M1 is illustrated with a typical nosepiece 51 on which a turret 53 is mounted for rotary movement to index an objective lens LA in alignment (FIG. 12) with the optical axis of the microscope and ocular, or alternately to position a microspark probe PA in position with the probe electrode tip aligned (FIG. 13) on the microscope's optical axis. Sample S is positioned on an adjustable stage 7A for movement relative to the optical axis of the microscope. It will be noted that an intermediate gap CGA is provided in this embodiment by the spacing between a spark contact electrode 19A projecting from the side of probe PA and so positioned that as probe PA is moved to its sparking position (FIG. 13) over sample S, electrode 19A is closely adjacent but spaced away from a projecting electrode 29A. This latter spark gap electrode may be adjusted relative to contact electrode 19A by rotary movement of a knob 55 projecting outwardly from an insulating electrode support 57 secured to a bracket 59 mounted on the microscope frame. The intermediate gap in this embodiment, indicated at CGA, has a high voltage electrical potential applied thereto via a connector or socket 15C into which is plugged a pin-connector end 17C of cable conductor 3. The inner end of contact electrode 19A contacts the surface of probe electrode PE to apply the high voltage potential thereto. It will be noted that this microspark probe PA has a screw-threaded collar 61 by which it is affixed to the turret 53 and is therefore interchangeable with any standard objective for microscope M1.

Figure 14:
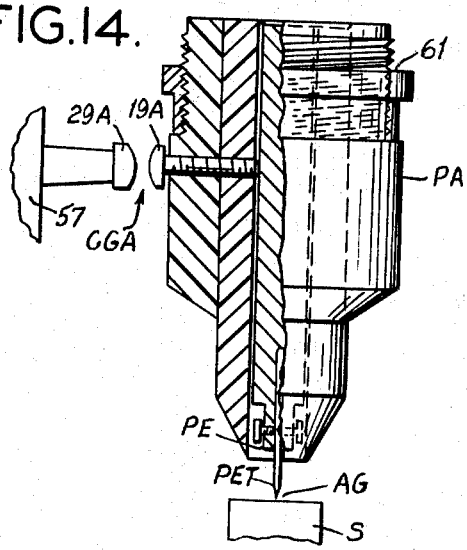
FIG. 14 is an enlarged side elevation, partially in section, of the microspark probe unit illustrated in FIGS. 12 and 13.
Figure 9:
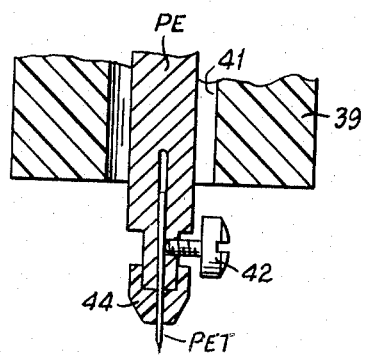
FIG. 9 is an enlarged fragmentary view of the electrode of the probe of FIGS. 5–8, partially in section.

Referring now to FIGS. 15–17, an objective-microspark probe unit LP is illustrated. It is essentially a a standard microscope objective with a shell 63 and a standard screw-threaded collar 61A for mounting on the nosepiece of a microscope. The usual lens elements of the objective are indicated at 65 and 67. Centrally positioned in the lower converging section of the objective shell is a polished transparent disc 69 (preferably of "Lucite") provided with a central recess 71 in which is received the replaceable probe electrode tip PET. Three centering screws 73 are provided to grip and adjust disc 71 so that the longitudinal axis of electrode tip PET is coincident with the optical axis of unit LP. In order to electrically energize PET an insulating block 75 is affixed to one side of shell 63. Block 75 carries a connector jack or socket 15D adapted to receive the end of a pin-connector plug end of a cable conductor 3, which when plugged into jack 15D will electrically energize PET via a conductive metal spring 77 and a metallic brush contact 79 which is biased thereby into engagement with PET. Spring 77 and contact 79 are positioned within a counterbored radial passage in disc 69. Because of the insulating nature of block 75 and disc 69, as well as the insulating bushings and fittings of jack 15D, shell 63 is not electrically energized. It will be noted that a metallic contact fitting with a smooth mushroom shaped head may be screwed into jack 15D and thereby constitute one electrode of an intermediate spark gap, similar to the arrangement illustrated in FIG. 14.

In accordance with the methods of this invention, a selected micro-area of a sample to be spectroscopically analyzed is electrically excited by forming a spark gap between the selected micro-area of the sample A and a contiguously positioned electrode tip. The sample, for example, may be the metallographically prepared surface of a uranium core section, or the like, to be analyzed as to the microcomposition of microinclusions. The sample is positioned on the stage of a microscope and the position of the sample is adjusted until a desired preselected micro-area is aligned with the optical axis of the microscope as indicated by the cross-hairs or reference system of ocular O. In the embodiments of FIGS. 1, 4, 12 and 13, the microspark probe is then indexed manually into a position with the probe electrode tip PET aligned over the preselected micro-area. As the stage is electrically grounded and sample S is electrically common to the stage, the other electrode of analytical gap AG is the preselected micro-area. Upon impressing a sufficiently high voltage potential, preferably unidirectional with PET being the cathode or negative electrode, a spark discharge takes place electrically exciting the preselected micro-area to form a spark column or plasma, the microspectra of the radiant energy thereof being utilized for spectroscopic or spectrographic analysis.

As the analytical resolving power of a directly excited system is determined by the diameter of the crater etched by the point-to-plane discharge, it is important to minimize this crater size. In accordance with the present invention, it has been found that this crater size is a function of four major variables: the radius of the cathode tip, the distance between the tip and the sample surface (i.e., the length or magnitude of the analytical gap AG), the peak voltage impressed, and the number of discharge cycles. By minimizing the point radius of tip PET so that it is preferably in the order of about one micron as noted above, and by controlling the other variables mentioned, it has been found that discrete sample zones as narrow as 5 microns wide or discrete areas having a diameter of about 10 microns can be selectively directly excited by the apparatus and methods of this invention.

The instrumentation of this invention also permits the use of very small analytical gaps in the order of about 5–40 microns. Peak voltages in the range of 600 v. to 2000 v. are preferably employed. As the number of discharges across gap AG is a major variable in determining the analytical resolving power, it is important that the number and therefore the frequency of the discharges be carefully controlled. One of the major problems in controlling this discharge frequency and in maintaining a minute analytical gap has been the extreme difficulty in avoiding the development of space charge and Townsend discharge phenomena at the analytical gap AG. Dark corona effects at the electrode tip, which cause the discharge rate to be highly erratic, have been found to be eliminated in accordance with the invention by serially interconnecting an intermediate gap (CG or CGA) between the high voltage potential source PS and the analytical gap. By adjusting the length or magnitude of this intermediate gap so that it exceeds that of the analytical gap AG, the voltage rise of the potential source PS immediately following a discharge is not "seen" by the analytical gap. Thus corona or Townsend discharge at the analytical gap is prevented. In effect the intermediate gap "gates," triggers or controls the discharge at the analytical gap so that the discharge frequency may be made regular or uniform at a desired rate. It is preferred that the magnitude of the intermediate gap be about 10 to 100 times that of gap AG. For example, if gap AG is set to 10–12 microns, it has been found that an intermediate gap of 150 microns is quite effective in minimizing corona discharge and stabilizing the discharge frequency at gap AG. The schematic circuitry of these two series gaps is illustrated in FIG. 2. As it is desired to provide a high instantaneous current during the brief periods of discharge and to heat the sample as little as possible, it is preferred that a current limiter or regulator means, such as CR in FIG. 3, be serially connected in the circuit to insure that the average current is not excessive, e.g., a 50 microampere average current is an exemplary value found to be useful in the practice of this invention.

As indicated in FIG. 3, means are provided (an adjustable transformer in this instance) for varying the applied voltage across the serially connected spark gaps. Another variable that is conveniently controllable is the length of the intermediate gap which may be varied by knob 31 (FIG. 11) or knob 55 (FIG. 13). The number of sparks may be easily controlled or limited to any predetermined number by the use of any conventional pulse counter device which operates to deenergize the potential source PS after the occurrence of this preselected number. This is particularly desirable in making quantitative microspectrographic analyses. In view of the uniform discharge frequency obtainable with this invention, this may be accomplished by a simple timer device which limits the duration of sparking. The frequency, as indicated above, is a function of both the intermediate gap magnitude and the applied voltage level. Exemplary values of this frequency are in order of 2–40 spark discharges or more per second. The length of the first or analytical gap AG, which determines the size of the zone excited, may be conveniently adjusted, for example by adjustment of the microscope focus.

As the sensitivity of the methods and apparatus of this invention is a function of the integrated spectral intensity of radiation relative to the inherent noise level of the particular spectroscope or spectrograph apparatus employed, it is desirable to conserve or utilize the maximum radiant energy of the spark plasma to insure maximum spectral intensity. Although this is dependent on the illumination efficiency and relative aperture and grating characteristics of the particular spectroscope or spectrograph used, as well as the sensitivity of the photographic or photoelectric receiver of spectrograph SG, it is preferred that the analytical gap AG be positioned precisely at the slit focus position of the spectroscope or spectrograph so that the spark plasma constitutes the effective slit thereof.

In the practice of this invention with the objective-microspark probe unit LP of FIGS. 15–17, it has been been found that by positioning probe electrode tip PET as illustrated with its point about .5 mm. above the focal plane when the objective is in a normal viewing position, the optical performance is not significantly impaired and an image of high resolution and contrast is obtained. Any conventional means for illuminating the sample surface may be used for visual selection and observation of the preselected micro-area of sample S. For example, the left optics of the stereomicroscope M of FIG. 4 may be utilized to provide built-in axial illumination by reflecting an external light source through the left optics at the sample. Also, it is sometimes desirable to visually observe the sparking at gap AG and an auxiliary microscope may be angularly mounted for visually monitoring this.

One of the particularly advantageous features of this invention is that any of the microspark probes (L, LA and the objective-probe unit LP) can readily be substituted for an objective lens without modification of the microscope which would render it unsuitable for conventional use. Thus by providing any of these units as a relatively inexpensive accessory, any microscope can be simply converted to microspectroscopy.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for in situ microanalysis of a selected micro-area of a sample to be spectroscopically analyzed comprising:
    a microscope having
        a stage for mounting a sample to be analyzed,
        an ocular,
        an objective adapted to be positioned in optical alignment with said ocular,
        and means for varying the position of the sample relative to the optical axis of the microscope whereby a selected micro-area of said sample may be positioned on the optical axis of said microscope,
    a microspark probe including an electrode positionable relative to a selected microarea of the sample thereby to form a spark gap, said electrode being unshielded and having a tip radius in the order of about 1 micron,
    means for positioning said probe in optical alignment with said ocular,
    and means for electrically energizing the probe and the sample whereby a discrete micro-area of the sample is selectively sparked to form a spark plasma, the microspectra of the radiant energy thereof being useful for spectroscopic and spectrographic analysis.

2. Apparatus as set forth in claim 1 in which the probe and the objective are mounted for movement between a first position, in which said objective is in optical alignment with said ocular and the probe is out of optical alignment, and a second position, in which the probe is in optical alignment with said ocular and the objective is out of optical alignment.

3. Apparatus as set forth in claim 2 in which the objective and the probe are mounted on a nosepiece which is movable alternately to position the probe and the objective in optical alignment with said ocular.

4. Apparatus as set forth in claim 1 in which the objective and the probe are coaxially mounted on the optical axis of the microscope and both the probe and the objective are in optical alignment with said ocular.

5. Apparatus as set forth in claim 1 which further includes means for continuously moving the position of the sample relative to the optical axis whereby the surface of the sample is scanned by an electric spark.

6. Apparatus as set forth in claim 1 which further includes means whereby the spacing, which constitutes said spark gap, between the tip of the electrode and the preselected micro-area of the sample may be varied.

7. Apparatus as set forth in claim 6, which further includes means for sensing the number of spark discharges across said first gap and terminating said discharges after the occurrence of a preselected number of said discharges.

8. Apparatus as set forth in claim 6 which further includes a high voltage potential source and an intermediate spark gap serially connected with the first said spark gap.

9. Apparatus as set forth in claim 8 which further includes means for varying the magnitude of said intermediate gap independently of said first gap whereby corona discharge at the first gap is minimized and the discharge frequency is stabilized.

10. Apparatus as set forth in claim 8 wherein the high voltage potential source includes a current limiter.

11. Apparatus as set forth in claim 8 which further includes means for positioning the first gap at the entrance aperture of a spectroscopic system.

12. Apparatus as set forth in claim 8 which further includes means for moving the microspark probe and electrode tip relative to a surface of the sample without substantially varying the magnitude of the first spark gap whereby the sample surface may be scanned.

13. In apparatus for selectively exciting a micro-area of a sample to be spectroscopically analyzed,
    a microscope having
        a stage for mounting a sample to be analyzed,
        an ocular,
        an objective,
        means for positioning said objective in optical alignment with said ocular,
        a microspark probe including an electrode positionable relative to a selected micro-area of the sample thereby to form a spark gap, said probe being secured to the objective and in optical alignment therewith, said electrode being unshielded and having a tip radius in the order of about 1 micron,
        and means for varying the position of the sample relative to the optical axis of the microscope whereby any selected micro-area of said sample may be positioned on the optical axis of said microscope, and means for electrically energizing the probe and the sample whereby a discrete micro-area of the sample may be visually preselected and this discrete micro-area of the sample may be selectively sparked to form a spark plasma, the microspectra of the radiant energy thereof being useful for spectroscopic and spectrographic analysis.

14. In apparatus as set forth in claim 13, said objective including an electrical contact constituting one electrode of an intermediate spark gap, said contact being electrically connected to said microspark probe electrode which constitutes one electrode of an analytical spark gap.

15. Apparatus for optically preselecting a micro-area of a sample to be spectroscopically analyzed and thereafter electrically exciting the discrete preselected micro-area, said apparatus comprising an objective for a microscope, means for positioning said objective in optical alignment with an ocular of said microscope, a microspark probe electrode secured to the objective and having its longitudinal axis in optical alignment with the optical axis of said objective, said probe electrode being unshielded and having a tip radius in the order of about 1 micron, said probe electrode tip being spaced slightly above the focal plane of the objective, means for positioning said electrode tip closely adjacent the sample micro-area thereby to form a spark gap, and means for electrically energizing the probe electrode and the sample whereby a discrete micro-area of the sample may be visually preselected and upon electrically energizing the probe electrode this discrete micro-area of the sample may be selectively sparked to form a spark plasma, the microspectra of the radiant energy thereof being useful for spectroscopic and spectrographic analysis.

16. Apparatus as set forth in claim 15 which further includes means for limiting the total number of discharges whereby after a preselected number of discharges occur the excitation of the micro-area is discontinued.

References Cited by the Examiner

UNITED STATES PATENTS

| | | | |
|---|---|---|---|
| 2,346,512 | 4/1944 | Scribner et al. | 88—14 |
| 2,456,116 | 12/1948 | Enns | 88—14 |
| 2,944,172 | 7/1960 | Opitz et al. | 250—49.5 |

OTHER REFERENCES

"The Encyclopedia of X-Rays and Gamma Rays," edited by G. L. Clark, Reinhold Publishing Corp., New York, 1963, pp. 818–824.

RALPH G. NILSON, *Primary Examiner.*

WALTER STOLWEIN, *Examiner.*

W. F. LINDQUIST, *Assistant Examiner.*